No. 718,555. PATENTED JAN. 13, 1903.
W. G. WARING.
METHOD OF PRODUCING PURE WHITE PIGMENT.
APPLICATION FILED JUNE 14, 1902.
NO MODEL.
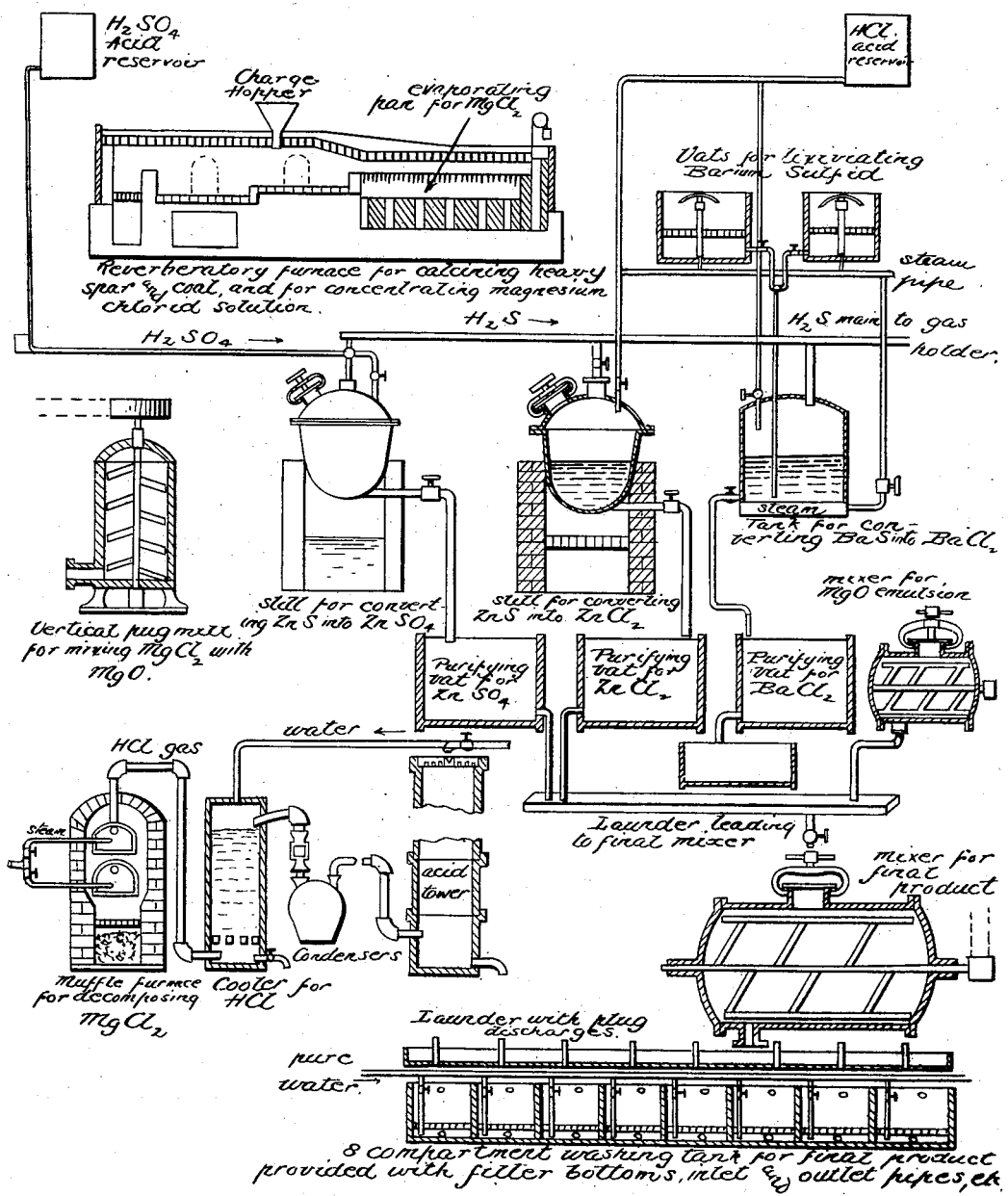

UNITED STATES PATENT OFFICE.

WILLIAM GEORGE WARING, OF TYRONE, PENNSYLVANIA.

METHOD OF PRODUCING PURE WHITE PIGMENT.

SPECIFICATION forming part of Letters Patent No. 718,555, dated January 13, 1903.

Application filed June 14, 1902. Serial No. 111,753. (No specimens.)

*To all whom it may concern:*

Be it known that I, WILLIAM GEORGE WARING, a citizen of the United States, residing at Tyrone, Blair county, Pennsylvania, have invented certain new and useful Improvements in Methods of Producing Pure White Pigment, of which the following is a specification.

My new process relates to the manufacture of a new white pigment, which I have called "zinc blanc fixé." This new pigment consists of a chemically-prepared mixture of zinc oxid and barium sulfate in variable proportions. Its manufacture requires, in the form of raw materials, as follows: (a) crude zinciferous ores; (b) heavy spar, either separate from or combined or mixed with the zinciferous ores; (c) fuel, and as intermediate (regenerative) agents: (a) an acidulated regenerative leaching fluid; (b) magnesium oxid and chlorid or oxychlorid.

The process comprises ten operations, namely:

1. The extraction of zinc from ores and other material containing zinc, by means of lixiviation with a regenerative acidulated solution, described in detail in my application, Serial No. 111,750, filed June 14, 1902.

2. The separation from the aqueous product of 1 of the metals of the copper-cadmium group by means of zinc sulfid, as described in detail in my above-mentioned application, Serial No. 111,750, filed June 14, 1902.

3. The precipitation of the zinc contained in said aqueous product by means of hydrogen sulfid, as described in detail in my said application.

4. The conversion of a portion of the zinc sulfid thus produced into soluble zinc sulfate by calcination and treatment of the resulting zinc oxid with the sulfurous gases produced during calcination or with the gases from the calcination of the sulfur contents of the leaching residues, with subsequent oxidation, or by direct decomposition of the sinc sulfid by means of hydrated sulfuric acid in a closed retort.

5. The decomposition of another portion of the zinc-sulfid product of 3 into zinc chlorid and hydrogen sulfid by means of hydrochloric acid in a closed retort or still, as described in detail in my application, Serial No. 111,751, filed June 14, 1902.

6. The conversion of barium sulfate (heavy spar) into barium sulfid by furnacing with coal in a reverberatory furnace.

7. The decomposition of the barium-sulfid product of 6 into barium chlorid and hydrogen sulfid by means of dilute hydrochloric acid and the purification of the barium-chlorid solution from iron by means of chlorin and zinc oxid or barium carbonate.

8. The precipitation of the zinc chlorid and sulfate solutions produced from 5 and 4 by means of an emulsion of magnesium oxid with the barium-chlorid solution from 7 and washing the pigment so precipitated.

9. The evaporation of the liquor resulting from 8 containing only magnesium chlorid and addition thereto of a definite amount of magnesia, as described in my application, Serial No. 111,752, filed June 14, 1902.

10. The calcination of the product of 9 for the regeneration of the magnesium oxid and hydrochloric acid, as described in my said application No. 3.

To carry out the process successfully, it is necessary to describe more fully the operations Nos. 6, 7, and 8, in connection with the details given in my applications Nos. 1, 2, and 3 referred to.

It is not essential that the heavy spar to be used in 6 should be pure. If the residues from the lixiviation in 1 consist chiefly of heavy spar, they may be used for the production of barium sulfid. The heavy spar is to be mixed very intimately by grinding with from thirty to forty per cent. of its weight of bituminous coal, according to the quality of the latter, and ignited in batches at a strong red heat in an ordinary reverberatory furnace for one and one-half to two hours or until the flames of burning CO evolved are seen to diminish. The product is drawn when finished into a closed receptacle in order that it may cool to nearly 212° Fahrenheit without contact with fresh air. The crude sulfid is then lixiviated with boiling water, one hundred parts of which dissolves nearly twenty-nine parts of BaS, nearly ninety per cent. of which is deposited upon cooling in the form of crystalline $BaS8H_2O$. The lixiviation of the crude sulfid is best conducted in a vessel provided with a filtering-diaphragm with a capacious space beneath containing the lower end of an open pipe extending through the filter to the top of the vessel, provided with a steam jet at the lower end, whereby the liquor as it passes through the filter is forced again to the top and there spread over the material by means of a concave cap fixed over the upper extremity of the stand-pipe. A concentrated hot solution is thus obtained which may be treated directly with HCl in a closed wooden or stoneware vessel for the production of the $BaCl_2$ and $H_2S$ of 7. The weaker liquors resulting from subsequent lixiviations of the partly-spent crude sulfid are to be reserved for the first lixiviation of fresh batches of crude sulfid. The completely-spent residues, still containing twenty to forty per cent. of the barium originally used, partly as carbonate and partly in thionic combinations, may be exposed to the action of sulfurous furnace-gases and again reignited with the coal for the recovery of a fresh amount of BaS. After the second leaching the residues, now consisting chiefly of earthy matters derived from the coal, may be discarded as waste ashes.

The decomposition of barium sulfid by means of hydrochloric acid may be conducted in any closed stoneware or enameled retort or generator, which can be heated to the boiling-point to insure complete expulsion of the $H_2S$ product. The HCl is preferably admitted gradually under pressure from an elevated reservoir, and only such quantity is to be added as is chemically equivalent to the amount of barium present in the BaS solution as determined by its volume and density by the hydrometer.

The purification of the resulting solution of $BaCl_2$ of 7 by means of chlorin and barium carbonate or zinc oxid is a well-known operation requiring no description. The object is to remove any traces of iron which may have contaminated the acid or the $BaCl_2$. The $H_2S$ resulting from 7 is first conducted through a weak solution of BaS to free it from HCl and then to a gas-holder, where it is stored for use in 3. The precipitation of the mixed zinc chlorid and sulfate in 8 requires special precautions in order to secure a successful result. The quantities of the several materials used must be so proportioned that for each part of metallic zinc present in the solution as sulfate the emulsion must contain the equivalent of 3.736 parts of $BaCl_2$ $2H_2O$ (the result of the complete decomposition of 3.57 parts of pure heavy spar) and 0.6158 parts of pure MgO, and also in addition thereto a like proportion of MgO for each part of metallic zinc present in the solution in the form of chlorid. Thus when the $ZnSO_4$ and the $ZnCl_2$ solutions produced from 4 and 5 result from equal quantities of ZnS there will be required for each unit of zinc present in the mixture 1.868 parts of $BaCl_2$ $2H_2O$ and 0.6158 part of MgO in the emulsion, and the product will contain nearly seventy-five per cent. of $BaSO_4$ with twenty-five per cent. hydrated zinc oxid, or if completely dehydrated its composition is theoretically 74.15 per cent. $BaSO_4$ and 25.85 per cent. ZnO.

It follows that the relative proportions of ZnO and $BaSO_4$ in the precipitate may be varied according to the ratio of ZnS converted into sulfate or chlorid in 4 and 5. Thus to obtain a product containing equal proportions, by weight, of ZnO and $BaSO_4$ 1.87 parts of Zn(2.78 ZnS) must be converted into $ZnCl_2$ for one part Zn(1.49 ZnS) converted into $ZnSO_4$, and there will be required for the emulsion 3.74 parts $BaCl_2$ $2H_2O$ and 1.77 parts of MgO.

To avoid the production of oxychlorids in this process, the same precautions are to be observed which are set forth at length in my application No. 3 of this date.

In the accompanying diagrammatic drawing I have indicated the means used for carrying out the method hereinbefore described.

I claim as my invention—

1. The method of producing a pure white pigment consisting of barium sulfate and zinc oxid, by precipitating a mixed solution of zinc sulfate and chlorid with an emulsion composed of magnesium oxid suspended in a solution of barium chlorid, as hereinbefore described.

2. The method of producing a pure white pigment consisting substantially of barium sulfate and zinc oxid, the components of which may bear any desired ratio to each other, wherein a solution of zinc sulfate and chlorid containing definite proportions of each salt is precipitated by means of an emulsion of magnesia in a solution of barium chlorid containing so much barium chlorid as is exactly equivalent to the sulfate of zinc in the solution, and so much caustic magnesia as is exactly equivalent to the total zinc contained in the solution, as hereinbefore described; and the residual solution after separation from the pigment so precipitated is evaporated, the residue mixed with about twenty-five per cent. of magnesia, and calcined in contact with aqueous vapor for the recovery of the magnesia and hydrochloric acid, substantially as described above.

3. The process for the production of a pure white pigment consisting of zinc oxid and barium sulfate, the components of which may bear any desired ratio to each other, which process consists in subjecting raw ores or materials containing zinc in any combination, along with heavy spar, either mixed, or separate, to lixiviation with a special regenerative fluid consisting of an extremely dilute aqueous solution of sulfuric acid and ferric sulfate for the extraction of the zinc, and subsequent precipitation of the zinc by means of hydrogen sulfid; calcining the residue, or heavy spar, with coal, lixiviating with water and decomposing the liquid thus produced by means of hydrochloric acid to produce hydrogen sulfid and barium chlorid; conversion of determined proportions of the precipitated zinc sulfid into zinc sulfate and zinc chlorid by treatment with the respective acids or otherwise, as described; precipitation of the solution of zinc salts so procured by an emulsion of calcined magnesia in barium-chlorid solution in definite proportions as described; thereby producing the pigment required; separation of the magnesium-chlorid solution from the precipitated pigment, and recovering the magnesia and hydrochloric acid therefrom for reuse, by means of evaporation, and calcination in contact with aqueous vapor substantially as hereinbefore described.

In testimony whereof I affix my signature in presence of two witnesses.

WILLIAM GEORGE WARING.

Witnesses:
A. M. HULL,
GUY H. WARING.